March 21, 1967

N. MILLERON 3,310,227

SURGE AND BACKSTREAMING POROUS DIAPHRAGM
FILTER FOR VACUUM SYSTEM
Filed April 12, 1965

INVENTOR.
NORMAN MILLERON

BY

*Bernard A. Anderson*

ATTORNEY 3,310,227
SURGE AND BACKSTREAMING POROUS
DIAPHRAGM FILTER FOR VACUUM
SYSTEM
Norman Milleron, Berkeley, Calif., assignor to the United
States of America as represented by the United States
Atomic Energy Commission
Filed Apr. 12, 1965, Ser. No. 447,588
15 Claims. (Cl. 230—101)

ABSTRACT OF THE DISCLOSURE

Evacuation system including a porous diaphragm filter having sinuous pore channels of a length and diameter preventing line-of-sight communication therethrough and interposed between vacuum pump means and a vacuum chamber to transect the evacuated gas stream and prevent pressure surges and backstreaming of extraneous foreign matter.

The invention described herein was made in the course of, or under, Contract W–7405–ENG–48 with the United States Atomic Energy Commission.

The present invention relates to evacuation systems and more particularly to apparatus utilizing an especially adapted porous material diaphragm filter to prevent passage of certain foreign or extraneous matter from an evacuation system into a vacuum chamber while being pervious to an atmosphere being evacuated from said chamber.

Materials contained or processes carried on within vacuum environments are often very susceptible to damage by contamination with foreign or extraneous matter. Foreign or extraneous matter is defined for purposes herein as any gaseous, vaporous or particulate material introduced into the vacuum chamber other than the gas or gases being evacuated therefrom. More particularly, such foreign matter often originates in the vacuum pump used as the evacuating means. Examples of such materials include working fluid particles from vacuum pumps of a type which utilize a fluid medium in the evacuation process, e.g., diffusion pumps, vacuum pumps using a fluid seal, e.g., various mechanical pumps, and even cryogenic adsorption pumps which collect and concentrate on its adsorbing element contaminating materials from the various components within the vacuum system. Even when evacuation flow is maintained from the chamber being evacuated to the vacuum pump, such particles may be capable of backstreaming from the pump into the vacuum chamber.

Attempts to alleviate the problem have been only partially successful, and none has completely eliminated the problem. For example, the contamination of vacuum chambers by the reverse flow of the pump working fluid is somewhat alleviated by baffle plates disposed across the conduit connecting the vacuum pump and vacuum chamber. Working fluid particles migrating from the pump to the vacuum chamber collide with the baffle and are retained thereon by adhesion. However, it is still possible for working fluid particles to pass between the baffle plates without colliding and adhering thereon.

Further prior art refinements of the baffle protection systems included arranging the baffle to cause a cascading flow therethrough and thereby increase the probability of particle impingement upon the baffle plates and/or cooling the baffle to promote condensation or collection of the fluid particles thereon. The limitations of such refinements appear dramatically during over-pressure incidents. An over-pressure incident may be defined as occurring in an evacuation system in which partial or complete evacuation of the vacuum chamber has been achieved and then a sudden high gas flow into the vacuum system occurs due to mechanical or hermetic seal failure, outgassing, etc. The sudden gas flow moves through the vacuum system as a shock wave. If the shock wave originates in the vacuum pump, it moves toward the vacuum chamber carrying entrained vacuum pump fluid. A shock wave may also originate in the vacuum chamber or evacuation conduit of the vacuum system so that working fluid will be spattered from the pump throughout the vacuum system.

A further limitation of prior art baffle-type vacuum protection systems is the low inherent evacuation efficiency due, at least in part, to the poor conductance of baffle arrangements to passage of gas therethrough. With free molecular flow conditions, typical cascade baffles of the type which prevent a line-of-sight communication of gas flow through the baffle permit only about 10% of the gas molecules to pass through to the vacuum pump while 90% of the molecules are deflected and returned to the vacuum chamber. For optimum speed of evacuation, it is necessary that transmissivity of the system between the chamber being evacuated and the evacuating means be as high as possible.

To prevent the passage of turbulent gas flow and large quantities of entrained working fluid into a chamber under vacuum, vacuum pumps often are adapted with fast response valves disposed between the vacuum pump and vacuum chamber. Such valves were intended to isolate completely the vacuum chamber from the pump in response to a loss of hermetic conditions within the system. The response time of such valves has proven to be inadequate to prevent at least some contamination of the vacuum chamber by entrained working fluid particles. In addition, such valves require finely adjusted pressure sensing and switching equipment thereby adding to the complications of the vacuum system.

The present invention provides apparatus for preventing undesired migration of extraneous foreign matter in a vacuum while providing high evacuation rates in which an essential feature is the employment of an opaque porous diaphragm disposed in transverse relation to a gas flow path. "Opaque" is herein defined as the condition in which the pore paths through the porous diaphragm are of a size and sinuosity completely preventing line-of-sight communication therethrough. The opaque porous diaphragm is of a material and configuration which readily permits the passage of the gas being evacuated but which collects on its surface substantially all those extraneous material particles entering the pores of the diaphragm.

The device of the present invention has an additional advantage in sudden over-pressure incidents noted hereinbefore. Although the apparatus of the present invention permits normal gas flow during evacuations, the porous diaphragm will be restrictive to surges of greatly increased gas flow created during an over-pressure occurrence. Shock waves originating in the vacuum pump are attenuated and converted to viscous flow by the diaphragm before reaching the vacuum chamber. Hence, potential damage by the shock wave itself to materials or systems within the evacuated chamber is prevented.

Accordingly, it is a primary object of this invention to provide an improved vacuum pump apparatus which permits the facile passage of gas particles being evacuated while simultaneously being impervious to backstreaming extraneous or foreign matter.

More particularly, it is an object of the present invention to provide a vacuum pump apparatus which is impervious to adsorbable fluid particles entrained in a gas flow of shock waves or turbulent surge gas flows.

A further object of the present invention is to provide a vacuum pump apparatus which is impervious to backstreaming foreign matter under all operating conditions without adversely affecting the conductance to the gas being evacuated and hence speed-of-evacuation characteristics of the vacuum pump.

Other objects and features of advantage will be apparent from the following description taken in conjunction with the accompanying drawings in which.

In brief, a vacuum system for present purposes will basically include a high vacuum chamber as employed in accelerators, fusion technology, metallurgy, chemical and food processing, etc., and a high vacuum evacuating means. In accordance with the invention a filter assembly, including at least an especially devised and arranged, opaque porous filter diaphragm element is coupled between or is otherwise disposed to intercept backstreaming extraneous material and pressure surges in the total gas flow circuit between said vacuum chamber and evacuating means.

Figure 1:
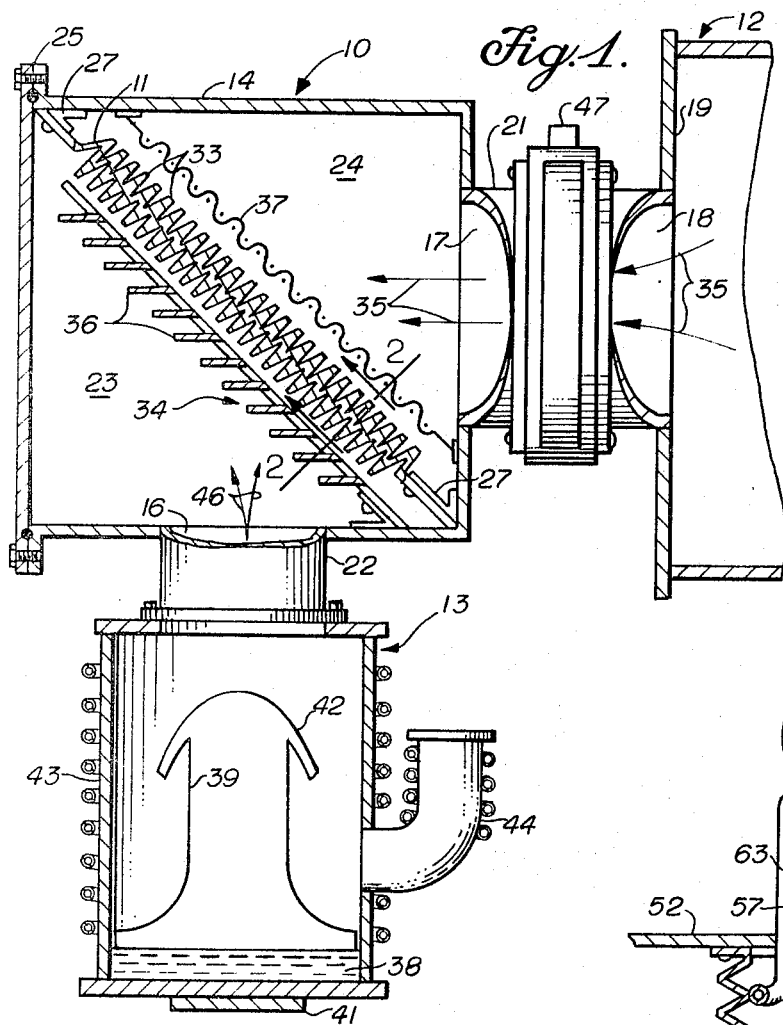
FIGURE 1 illustrates a cross sectional view of a porous diaphragm filter assembly adapted to a vacuum system employing a diffusion pump.

More particularly, in a first embodiment, illustrated in FIGURE 1 of the drawings, a filter assembly 10 including filter diaphragm element 11, is coupled between vacuum chamber 12 and, for example, diffusion pump means 13. The assembly 10, is provided with a housing 14 in which element 11 is disposed to intercept the gas flow path between an outlet port 16 and an inlet port 17. Vacuum chamber 12 may be provided with a port 18 defined in wall 19 thereof and conduit 21 employed to hermetically connect port 18 to inlet port 17 of assembly 10. Pump means 13 may similarly be connected to outlet port 16 by means of a conduit 22.

A preferred housing 14 has a rectangular cubical configuration or other equivalent shape having an internal maximum cross sectional area of the order of fivefold the area defined by port 17 as discussed hereinafter. Housing 14 is provided with a hermetically sealed joint 25 to permit access to the interior of housing 14 to remove and/or replace diaphragm 11.

Figure 2:
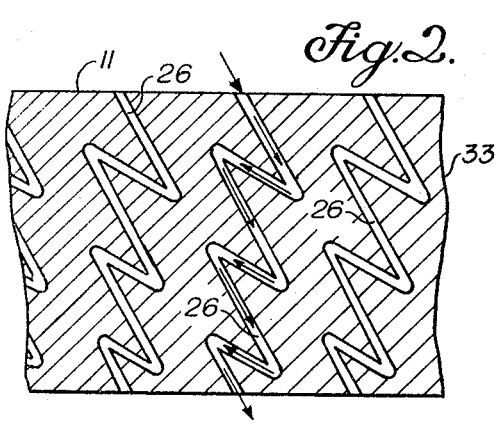
FIGURE 2 is an exploded cross sectional view of the porous diaphragm filter taken along line 2—2 of FIGURE 1 illustrating the pores and pore path passing through the filter element.

Referring now to FIGURES 1 and 2, porous opaque filter diaphragm 11 is hermetically and replaceably joined at its peripheral edge to the interior surface of housing 14 by means of bracket 27, diaphragm 11 being disposed transverse to the gas flow path from port 16 to port 17 to divide housing 14 into two separate chamber regions 23 and 24 respectively. Port 16 communicates with chamber region 23 and port 17 communicates with chamber region 24 respectively. Diaphragm 11 is disposed preferably in a plane defining the maximum internal cross sectional area of housing 14. For a rectangular cross sectional configuration, diaphragm 11 is positioned diagonally between opposite corners of housing 14. By positioning diaphragm 11 in this manner, a maximum diaphragm surface area is presented to the gas flow within a housing 14 of minimum cross sectional area and gas flow conductance is maximized.

As an essential feature diaphragm 11 is constructed of a material defining a multiplicity of pore channels 26 having an especially selected mean diameter and mean path length therethrough, i.e., the distance traveled by a gas particle as it passes through diaphragm 11 along channels 26. The particle size of the gas particles to which opaque porous diaphragm 11 is to be pervious determines the minimum diameter and pore path length of the diaphragm 11 for effective operation. The minimum pore diameter is determined as being larger than the particle diameter of a gas to which the diaphragm 11 is to remain permeable and further a particular gas which has the largest particle diameter of all gases which are to pass through pores 26 of the diaphragm 11.

In most evacuation systems, practical considerations suggest that the diameter of the diaphragm pores 26 not exceed a maximum size of the order of $3 \times 10^{-2}$ centimeters. However, it will be noted that by maintaining the sinuosity of the pore path and maintaining a high ratio of pore path length to pore diameter, effective prevention of backstreaming foreign matter will be accomplished under pressure differential conditions normally found to exist or arise between chamber 12 and diffusion pump means 13. The material thickness is necessarily increased as the port path length increases but not necessarily in direct proportion. Thus, a practical maximum for the diameter of pores 26 is established by usable thicknesses of diaphragm materials, the effect of those materials on gas flow conductance and many other factors, such as instantaneous system pressure and temperature, too numerous to relate in a simple formula. However, the effectiveness of a diaphragm of a given pore size easily can be determined empirically by subjecting the diaphragm to a gas flow of selected particles.

The ratio of pore path length to pore diameter is to be no less than a minimum value of 2. Further, the ratio of pore path length to pore diameter is preferably minimized to increase conductance of evacuated gases through diaphragm 11.

The degree of conductance of diaphragm 11 to the gas being evacuated is controlled by the diaphragm properties set forth supra and two additional factors: (1) the pore density of diaphragm 11, and (2) the exposed surface area of diaphragm 11 in relation to the cross sectional area of the gas flow impinging diaphragm 11. Surface port density is herein defined as the percentage of the lateral surface area of diaphragm 11 which is void or made up of pores 26.

The embodiment of FIGURE 1, is adapted, for example, to a vacuum system with ambient operating conditions being room temperature, a pressure of the order of $10^{-10}$ mm. Hg, the evacuation gas being hydrogen and the evacuation means 13 being a diffusion pump employing 400 mole wgt. silicone oil as a working fluid. The preferred properties of diaphragm 11 are as follows: average pore diameter is of the order of 150 microns; the opaque porous diaphragm material thickness is of the order of 2 millimeters; the pore path length to pore diameter ratio is of the order of 26; the surface pore density (or porosity) is of the order of 30% of the total surface area.

An opaque porous diaphragm material of these properties is commercially available as porous stainless steel sheet from the Pall Corporation under the tradename of Coarse Porous Sheet (CPS). Materials such as CPS are commonly manufactured by standard commercial processes of which one is a powder metallurgical process. In that process, the metallic particles are arranged in the selected thickness and sintered to fuse the particles together at their junctions. The selected particle size determines the pore diameter, hence, pore diameter can be varied by varying particle size.

An equally effective porous diaphragm material for the preferred embodiment of FIGURE 1 consists of an opaque porous stainless steel sheet having an average pore diameter of 5 microns, a diaphragm thickness of 0.013 cm., a pore path length to pore diameter ratio of 26, and a surface pore density, i.e., porosity of 50%. A material of these properties is commercially available from the Pall Corporation under the tradename of Ridgimesh. Ridgimesh is produced by a standard commercial process consisting of crushing an interwoven mesh of stainless steel screen. The pore size and pore path length are dependent and can be varied according to the characteristics of the interwoven screen and the crushing pressure.

To present the optimum useful diaphragm surface area of collection to the gas flow from chamber 12, diaphragm 11 is a folded configuration, i.e., an accordion like configuration, having alternate peaks and valleys. The depth of the valleys formed by the accordion bellows structure is preferably selected to be substantially but no greater than 10 times the distance between adjacent accordion peaks 33. The accordion shaped stainless steel diaphragm 11 is characterized by a conductance therethrough of approximately 20% of the gas from chamber 12 impinging thereon under molecular free flow conditions.

Although porous opaque diaphragm 11 can serve by itself as an effective barrier to the backstreaming foreign matter originating in vacuum pump 13, in some applications it is advantageous to attenuate the backstreaming foreign matter prior to its encountering diaphragm 11. This is because the adhesion of working fluid particles upon the surfaces of diaphragm 11 slowly saturates the surfaces of diaphragm 11 rendering diaphragm 11 unable to prevent the passage of such particles therethrough, or reduces the conductance of diaphragm 11 to the gas being evacuated from chamber 12. In either case, the effective operating life of diaphragm 11 depends upon the amount of fluid particles collecting thereon. Consequently, by attenuating the backstreaming flow of foreign matter, the frequency with which diaphragm 11 must be regenerated, i.e., treated to remove the particles collected on its surface, can be reduced.

To attenuate the flow of foreign matter reaching diaphragm 11 and hence increase its operating life, a baffle 34 comprising a series of louvered plates 36 is mounted within housing 14 adjacent and in covering relation to the surface of diaphragm 11 with respect to port 16. The louvered plates 36 of baffle 34 are oriented diagonally to the plane of diaphragm 11. The effectiveness of baffle 34 in lengthening the operating life of diaphragm 11 is enhanced preferably by constructing baffle 34 of porous sheet material similar to the construction material of diaphragm 11. The porous nature of baffle 34 thus increases its capacity to adsorb backstreaming fluid particles thereupon and further decreases the quantity of fluid particles impinging and adhering upon diaphragm 11.

The full effectiveness of the combination of diaphragm 11 and baffle 34 is realized during over-pressure surge conditions. As discussed hereinbefore, gas flow from pump 13 toward chamber 12 is of a shock wave or turbulent flow nature and contains a large quantity of entrained working fluid particles therein. Baffle 34 attenuates the violence of the gas flow and causes a large proportion of entrained working fluid particles to impinge and adhere thereupon.

The fluid particles remaining in the gas flow impinge and adhere upon diaphragm 11. In addition, diaphragm 11 further attenuates the violence of the gas flow therethrough. In those situations where the over-pressure surge originates on the pump 13 side of diaphragm 11, the present invention serves the additional purpose of preventing a violent gas flow from reaching chamber 12 and causing damage to materials or systems within chamber 12 by the violent gas flow itself.

As a means of regenerating diaphragm 11, a heater 37, preferably a resistive type heater constructed in the form of a grid structure pervious to gas flow, is mounted within housing 14 in thermal communication with diaphragm 11. By energizing heater 37 to heat diaphragm 11, the matter collected on diaphragm 11 is driven off thereby preparing diaphragm 11 for maximum conductance of gas flow therethrough. The material driven off by heating is usually exhausted by the vacuum pump system.

In operation, as noted hereinbefore, the vacuum system is maintained at room temperature. A vacuum is establish by diffusion pump 13 causing a flow of gas 35 from chamber 12 through port 17 and conduit 21 into housing 14. The properties of diaphragm 11, baffle 34 and heater 37, discussed hereinbefore, permit the gas to be evacuated from the vacuum system to flow therethrough into diffusion pump 13.

The diffusion pump 13 removes the gas originating in chamber 12 by typically vaporizing a working fluid 38, the above noted silicone oil in this case, contained at one end of a chimney 39 in thermal communication with a heating means 41. The vaporized working fluid is directed by chimney 39 to a nozzle 42 from which the vapor is ejected at a high velocity in the form of a vapor jet. As the gas particles from chamber 12 encounter the vapor jet, they become entrained in the vapor jet and are carried thereby to the cold jacket 43 of pump 13. The gas particles are condensed by the cold jacket 43 and subsequently removed by a second pump (not shown), usually a mechanical pump, which is communicated to pump 13 via a discharge line 44.

During normal evacuation, particles of the working fluid from pump 13 tend to migrate in small numbers through the vacuum system toward chamber 12 along path 46. Some of these particles are collected by baffle 34 and some pass therethrough. The particles which pass through baffle 34 tend to migrate further toward diaphragm 11. The design of diaphragm 11, discussed hereinabove, is such that the working fluid particles encountering diaphragm 11 will impinge and adhere upon either the surface of diaphragm 11 facing pump 13 or the pore surfaces within diaphragm 11.

As noted hereinbefore, diffusion pump 13 has, as a preferred working fluid, a silicone oil of 400 molecular weight, which oil is commercially available particularly from the Dow-Corning Corporation. The silicone oil is substantially completely condensed at a temperature of 30° C. Thus, in the room temperature operation of the vacuum system, the silicone oil encountering diaphragm 11 will be substantially completely adsorbed on its surfaces.

Another example of a typical working fluid for such a diffusion pump is phenoxy-phenoxy, benzene oil which is commercially available from the Monsanto Corporation. This diphenyl-benzene ether oil is substantially completely condensed at a temperature of 50° C. Thus, in the room temperature operation of the vacuum system, the phenyl ether oil will be completely adsorbed on the surfaces of diaphragm 11 while passing therethrough. Further, it is seen that the oil would be substantially completely adsorbed at ambient temperatures substantially higher than the preferred operating condition of room temperature. The phenyl ether oil illustrates the adaptability of the present apparatus to varying temperatures within the vacuum system since the oil would be substantially completely adsorbed at any ambient temperature lower than 50° C. However, under room temperature operating conditions, any fluid material having a heat of condensation of at least 8 kilocalories/gram-mole can be used as a vacuum pump working fluid.

Even under most favorable operating conditions, diaphragm 11 will have to be periodically regenerated. As noted hereinbefore, heater 37 is energized to heat diaphragm 11 to thereby liberate the foreign matter collected thereby. The liberated foreign matter is removed from the system by vacuum pump 13. To prevent the contamination of vacuum chamber 12 during the regeneration process, a hermetically sealing valve 47 can be interposed in the gas flow path 35 between housing 14 and vacuum chamber 12.

In the description set forth hereinbefore, the utilization of a porous opaque diaphragm in the gas flow path of a vacuum pump system to enhance vacuum pumping operations has been described with reference to its use in a diffusion type vacuum pump. However, as noted hereinbefore, the porous diaphragm can be adapted to any of the various types of high vacuum pumps. The following description will set forth the use of the diaphragm in a cryogenic type vacuum pump as employed to evacuate a chamber 52 adapted to contain a high temperature plasma as employed in fusion research where surge gas pressures are often encountered.

Figure 3:
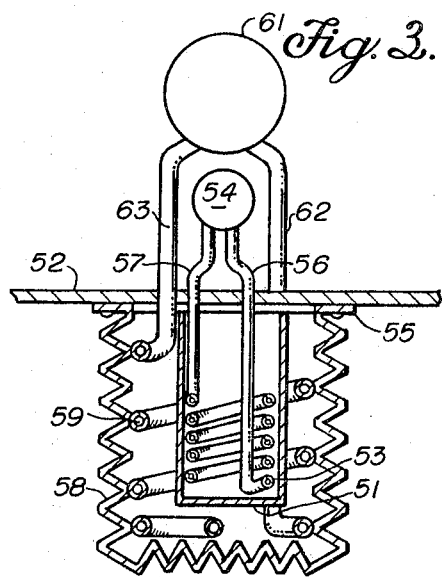
FIGURE 3 illustrates a cross sectional view of the porous diaphragm filter assembly adapted to a vacuum system with a cryogenic adsorber as the evacuating means.

Refering now to FIGURE 3, a cryogenic adsorbing element 51 is mounted within vacuum chamber 52. The adsorbing element 51 is cooled by passing a suitable coolant, e.g., liquid helium, through a coil 53 which is in thermal conducting relation within adsorbing element 51. The liquid helium is circulated through coil 53 from a liquid helium source 54 via tubes 56 and 57 which penetrate through the wall of chamber 52 in sealed relation to connect to coil 53.

A porous opaque diaphragm 58 is positioned to surround in spaced relation adsorbing element 51. Diaphragm 58 is preferably replaceably disposed by means of bracket 55. The preferred configuration of diaphragm 58 is folded or accordion like with its mean pore diameter and mean pore path length selected in accordance with those considerations set forth hereinbefore relative to diaphragm 11, of FIGURE 1.

As noted hereinbefore the adsorbing element 51 of the cryogenic pump collects on its surface foreign matter, e.g., nitrogen, methane, carbon dioxide, carbon monoxide, water, etc., originating within the vacuum pump system. In order that the chamber being evacuated may be protected from failures in the adsorbing element's cooling system, it has been the practice to isolate the adsorber 51 from the chamber 52 being evacuated by, for example, a suitable valve. However, by surrounding the adsorbing element 51 with diaphragm 58, which is impervious to the foreign matter, the adsorbing element 51 can now be positioned within the chamber 52.

Diaphragm 58 can be constructed and operated to serve the additional purpose of preventing energetic radiation products from the high temperature plasma contained in chamber 52 from impinging adsorber 51. Radiation products include, for example, photons, electrons, ions and energetic neutrals. If such radiation products are allowed to impinge on adsorber 51 in great quantities, the adsorber 51 may become overloaded as a result of the energy imparted thereto, saturating the heat removing capacity of adsorber 51, thus decreasing or negating its evacuating capability.

To remove the energetic radiation products, diaphragm 58 is constructed of a heat conductive type of material, e.g., a porous copper sheet. Further, copper diaphragm 58 is cooled by disposing a second coil 59 in the space between the adsorber 51 and diaphragm 58 in thermal conducting relation with diaphragm 58. The individual windings of coil 59 are spaced apart to allow gas flow communication between adsorber 51 and diaphragm 58. Coolant, e.g., liquid nitrogen, is circulated from a liquid nitrogen source 61 via tubes 62 and 63 which hermetically penetrate the walls of chamber 52 to connect to coil 59. The energetic radiation products give up their energy to the circulating coolant as a result of either their impingement upon the surface of diaphragm 58 or, upon entering the pores, their unavoidable collisions with walls of the non-line of sight pores defined by diaphragm 58.

As noted above, adsorber 51 is cooled with liquid helium and diaphragm 58 is cooled with liquid nitrogen. Hence, during operation the surface of adsorber 51 is maintained at liquid helium temperatures, i.e., approximately 4.18° K., and diaphragm's 58 surface is maintained at liquid nitrogen temperature, i.e., approximaely 77° K. Under these operating conditions, diaphragm 58 will be impervious to the particles of materials having a heat of adsorption equal to or greater than approximately 1.3 kilocalories/gram-mole. Thus, diaphragm 58 will remain previous to helium particles, such particles being collected by adsorber 51, while being impervious to foreign matter originating within the vacuum pump system. Therefore, the present improved cryogenic vacuum pump can be employed advantageously to enhance vacuum conditions over those obtainable by diffusion vacuum pumps alone since the cryogenic type vacuum pump has the capability of efficiently removing helium particles from a chamber being evacuated.

To increase the adsorbing capacity of the adsorbing element 51, it is intended that the adsorber 51 have a surface comprised of a porous material having pore and material characteristics similar to that of beforedescribed diaphragms. Also, it is contemplated that the exterior surface of adsorber 51 present an accordion-like surface configuration to the impinging particles.

In the previously described embodiments, the porous diaphragm has been described as it would be used in combination with a vacuum pump. However, a further embodiment of the present invention is contemplated wherein the porous diaphragm is operated as a vacuum pump itself. The vacuum pump porous diaphragm embodiment will be described with reference to FIGURES 1 and 3.

Vacuum pump 13 is isolated from housing 14 by a selectively controlled valve, for example, one similar to valve 47, disposed within conduit 22. Diaphragm 58 is disposed as diaphragm 11, transverse to the gas flow path from port 16 to port 17. Coil 59 is disposed in thermally conducting relation to diaphragm 58. Coolant is circulated from source 61 via tubes 62 and 63 which hermetically penetrate the walls of housing 14 to connect to coil 59. Liquid helium is circulated through coil 59. The high thermal conductivity of copper diaphragm 58 causes diaphragm 58 to approach the ambient temperature of coil 59, i.e., approximately 4.18° K. Because of the high thermal conductivity of diaphragm 58, this low temperature condition can be maintained with coil 59 in thermally conductive relation to only the peripheral surfaces of diaphragm 58.

It will be noted that, in other embodiments, the porous diaphragm was described as being a metal. In this embodiment, i.e., where diaphragm 58 is cooled from its periphery, it is important that diaphragm 58 be of a class of metals having high thermal conductivity at cryogenic temperatures. Preferably, diaphragm 58 is of a class of materials having thermal conductivities at cryogenic temperatures of the order of or greater than 1 cal./sec./cm.²/cm./° C. Examples of such materials include 99.999% pure silver, high purity copper and coalesced copper. Diaphragm properties other than conductivity are in accord with previously described embodiments.

All gases, including helium, from chamber 12 which impinge on diaphragm 58 are adsorbed thereonto. The thermal conductivity of copper diaphragm 58 permits the maintenance of diaphragm 58 at low cryogenic temperatures and hence very rapid removal of heat generated by the adsorption of gases on the surface of diaphragm 58. Thus, diaphragm 58 effectively acts as a vacuum pump and filter surface with gas flow from chamber 12 passing into the pores of diaphragm 58 and terminating on the surfaces of diaphragm 58.

The isolation of pump 13 from housing 14 and hence chamber 12 insure the substantial absence of pumping fluid particles in housing 14 and chamber 12. The dust free properties of metallic diaphragm 58 prevent foreign extraneous matter originating from diaphragm 58 and reaching chamber 12.

In this embodiment, it is anticipated that a diffusion vacuum pump would normally be used to regenerate the surfaces of diaphragm 58. When the surfaces of barrier 58 are saturated with adsorbed gas particles, barrier 58 can be regenerated as discussed hereinbefore while maintainiing the achieved vacuum conditions within chamber 12. Valve 47 is closed to hermetically isolate chamber 12 from housing 14. The valve isolating pump 13 from housing 14 is opened. The circulation of coolant through coil 59 is halted permitting diaphragm 58 to rise to the room temperature, i.e., the ambient temperature of the vacuum system. Adsorbed gas particles are released from the surface of diaphragm 58 and migrate to pump 13, regenerating diaphragm 58. To permit diaphragm 58 to further evacuate chamber 12, coolant circulation is resumed in coil 59, pump 13 is again isolated from housing 14 by a valve in conduit 22, and valve 47 is opened.

By thus alternating the cooling of diaphragm 58 and the regeneration of diaphragm 58, enhanced evacuation of chamber 12 can be achieved.

It will be noted in this embodiment that when coolant is not circulated through coil 59 and all valving is left open to permit gas flow from chamber 12 through diaphragm 58 to pump 13, the apparatus of this embodiment will operate as the first embodiment set forth in FIG. 1. It is even possible to operate cryogenically cooled diaphragm 58 in conjunction with pump 13 as a stepped vacuum pumping system.

The inherent advantages of this embodiment are numerous. During such evacuation, no vacuum pump working fluid has access to the vacuum chamber. Diaphragm 58, being metallic, does not have dust or other extraneous matter on its surfaces which matter might particularly interfere with electromagnetic field established in, e.g., a plasma containment chamber. The high thermal conductivity of diaphragm 58 permits the large surface area of diaphragm 58 to rapidly equilibrate to cryogenic temperatures of coil 59 even when coil 59 is connected with only the peripheral surfaces of diaphragm 58.

The high thermal conductivity of diaphragm 58 also enables diaphragm 58 to rapidly transfer to coil 59 thermal energy deposited on the surface of diaphragm 58 by gas particles being adsorbed thereon. Finally, this embodiment permits multiple evacuation techniques. Diaphragm 58 may operate in conjunction with a vacuum pump as described with particular reference to FIGURE 1. It may further operate as a vacuum pump by itself by activatiing coil 59 with liquid helium and isolating pump 13 from the vacuum system. By the intermittent operation of diaphragm 58 as a cryogenic surface and then regenerating diaphragm 58 by means of pump 13 as discussed hereinbefore, evacuation can be continued for long periods of time.

While the present invention has been herein described with particular respect to two particular embodiments, it will be apparent that numerous modifications and variations are possible within the spirit and scope of the present invention. For example, although the invention is described particularly in relation to a vacuum system employing diffusion and cryogenic vacuum pumps, it is readily adaptable to be employed in vacuum systems with vacuum pumps of other types where it is desirable to prevent backflow of foreign matter into a particular region. Examples of other types of vacuum pumps to which the present invention would be adaptable include oil sealed mechanical pumps and fluid ejector pumps generally.

A particular construction for housing a diaphragm 11 of FIGURE 1 is described as being a rectangular cubical housing 14 hermetically mounted between conduits 21 and 22 and defiing a right angle gas flow path between port 18 of chamber 12 and port 16 leading to pump 13. It will be readily apparent that other configurations are possible; for example, diaphragm 11 could be mounted directly within port 18 of chamber 12 with pump 13 immediately juxtaposed the surface of diaphragm 11 distal chamber 12.

Still further, diaphragm 11 is particularly described as being of metal and more particularly of stainless steel. However, it is also possible to use porous sheets of other metals and of other classes of materials such a glass, cellulose and minerals in which porosity can be controlled as described hereinabove. Certain of these materials might not have the structural strength available from metals but this could be overcome by supporting the diaphragm on a grid or other suitable supporting frame.

Diaphragm 11 has been described as being of accordion shape disposed within rectangular housing 14. Diaphragm 11 could also be of porous metal formed in many shapes to offer a large exposed area to gas flow impinging thereon. Examples of other diaphragm configurations include a conical porous diaphragm preferably within a cylindrical housing or even a series of conical sections, said sections being joined together to form a continuous porous barrier to gas flow impinging thereon.

Thus, the foregoing description is not intended to limit the invention except by the terms of the following claims.

What is claimed is:

1. In an evacuation system for removing particles from a chamber, the combination comprising a chamber defining an interior region to be evacuated, a vacuum pump hermetically communicated to said chamber interior to thereby establish a particle flow path therebetween, an opaque porous diaphragm disposed between said chamber and said vacuum pump transverse to the entire particle flow path therebetween, said diaphragm defining pore channels therethrough of a selected diameter at least slightly greater than the largest particle diameter of any of said particles being removed from said chamber, and a path length at least twofold greater than the average diameter of said pores.

2. An evacuation system as recited in claim 1 further defined by the pores of said diaphragm having a diameter in the range of about $2 \times 10^{-8}$ to $3 \times 10^{-2}$ centimeters.

3. An evacuation system as recited in claim 2 further defined by the pores of said diaphragm having a path length of the order of one hundred times the diameter of said pores.

4. An evacuation system as recited in claim 1 further defined by said porous diaphragm having a configuration providing a surface area greater than the cross sectional area of said particle flow path.

5. An evacuation system as recited in claim 4 further defined by said porous diaphragm having a folded configuration, defining alternate peaks and valleys, the depth of said valleys being less than ten times the distance between adjacent peaks.

6. An improved vacuum pump system, the combination comprising;
 (a) a vacuum chamber having a wall defining a vacuum chamber port for removing gases from said vacuum chamber,
 (b) a diffusion vacuum pump including a first housing having a wall thereof defining a vacuum pump port,
 (c) a second housing having at least a first and second wall defining respectively a first and second port, said first port hermetically communicated with said chamber port, said second port hermetically communicated with said vacuum pump port thereby defining a gas flow path between said diffusion vacuum pump and said chamber, and
 (d) an opaque porous diaphragm mounted transverse to the entire gas flow path to partition said first housing into first and second isolated chamber regions, said first port communicating into the first chamber region, said second port communicating into the second chamber region, said diaphragm defining pore channels therethrough of a selected diameter at least slightly greater than the particle diameter of any of said gases being removed from said chamber, and a path length at least twofold greater than the average diameter of said pores.

7. The vacuum pump system recited in claim 6 further defined by;
 (a) a louvered baffle including louver slats mounted adjacent in covering relation to the surface of said porous diaphragm facing said diffusion vacuum pump, said louver slats projecting away from said porous diaphragm in transverse relation to a line of sight path between said vacuum pump and diaphragm, and
 (b) a gas pervious electrical heating means mounted within said housing in thermally conductive relation to said diaphragm, said heater provided with terminal means which hermetically penetrate to the exterior of said housing to connect an energy source to said heater.

8. An improved vacuum pump system comprising,
(a) a vacuum chamber having a wall defining a vacuum chamber port for removing gases from said vacuum chamber,
(b) a diffusion vacuum pump including a first housing having a wall thereof defining a vacuum pump port,
(c) a rectangular housing having a first wall defining a first port and a second wall defining a second port, said first port adapted to be hermetically mounted to said vacuum pump port,
(d) a conduit hermetically communicating said second port with said chamber port thereby defining a gas flow path between said vacuum pump and said chamber,
(e) an opaque porous diaphragm of folded configuration defining alternate peaks and valleys mounted within said rectangular housing between diagonally opposite corners thereof with the peripheral edge of said diaphragm hermetically secured to the interior surface of said rectangular housing to partition said housing into first and second isolated chamber regions, said first port communicating into the first chamber region, said second port communicating into the second chamber region, said diaphragm defining pore channels therethrough of a selected pore diameter at least slightly greater than the largest particle diameter of any of said gases being removed from said chamber, and a path length at least twofold greater than the average diameter of said pores, the depth of said valleys of said diaphragm being less than ten times the distance between adjacent peaks,
(f) a louvered baffle including louver slats mounted in adjacent covering relation to the surface of said diaphragm facing said diffusion pump, said louver slats projecting away from said porous diaphragm in transverse relation to a line of sight path between said vacuum pump and diaphragm,
(g) a gas pervious electrical heating means mounted within said housing in thermally conductive relation to said diaphragm, said heater provided with terminal means which hermetically penetrate to the exterior of said housing to connect an energy source to said heating means, and
(h) valve means mounted within said conduit adapted to hermetically isolate on command said chamber being evacuated from said vacuum pump system.

9. The vacuum pump system recited in claim 8 further defined by said diameter of said pores being $1.5 \times 10^{-2}$ centimeters, and the mean path length of said pores twenty-six times the diameter of said pores.

10. A filter for vacuum pump systems which prevents a backstream flow therethrough of particles from a vacuum pump while being pervious to the atmosphere being evacuated from a chamber by said vacuum pump system comprising, in combination,
(a) a housing defining an interior region adapted to maintain a vacuum therein having at least a first and second wall defining respectively an inlet and outlet port each adapted for hermetic union, and
(b) an opaque porous diaphragm mounted within the interior of said housing to divide said housing into first and second isolated compartments, said inlet port communicating into the first compartment and said outlet port communicating into the second compartment, said opaque porous diaphragm having a multiplicity of sinuous pore channels therethrough of a minimum diameter of at least the maximum diameter of said gaseous and vaporous particles to be exhausted therethrough, and a pore path length at least twofold the pore diameter and offset in orientation to provide the opacity of said diaphragm.

11. The filter of claim 10 further defined by said diaphragm being replaceably mounted within said housing and said housing comprising two sections, said sections being hermetically joined together.

12. An improved vacuum pump system for removing gases from a chamber comprising;
(a) a vacuum chamber to be evacuated,
(b) a cryogenic vacuum pump including a cryogenic adsorbing element in communication with the interior of said chamber and a cooling means coupled to said adsorbing element, and
(c) an opaque porous diaphragm mounted in spaced surrounding relation to said adsorbing element to isolate said diaphragm from said chamber, said diaphragm defining pore channels therethrough of a selected diameter at least slightly greater than the largest particle diameter of any of said gases being removed from said chamber, and a path length at least twofold greater than the average diameter of said pores.

13. The vacuum pump system of claim 12 further defined by said porous diaphragm being hermetically and replaceably mounted to surround said adsorbing element.

14. An improved vacuum pump system for removing particles from a chamber adapted to contain a high temperature plasma comprising;
(a) a chamber adapted to contain a high temperature plasma, said chamber having at least one interior wall,
(b) a cryogenic adsorbing element including a cooling coil disposed within said adsorbing element mounted to the interior wall of said chamber, said adsorbing element adapted with fluid ducts hermetically coupling said cooling coil to a coolant source located exteriorly to said chamber to circulate said coolant through said coil,
(c) an opaque porous diaphragm having a folded configuration defining alternate peaks and valleys mounted in spaced surrounding relation to said adsorbing element, said diaphragm defining pore channels therethrough of a selected pore diameter at least slightly greater than the largest particle diameter of any said particles being removed from said chamber, and a path length at least twofold greater than the average diameter of said pores, and
(d) coolant circulating means mounted in the space defined by said adsorbing element and diaphragm in thermally conductive relation to said diaphragm, said coolant means adapted with fluid ducts hermetically coupling said coolant means to a coolant source located exteriorly to said chamber to circulate said coolant through said coolant means.

15. The vacuum system of claim 14 further defined by,
(a) said diaphragm constructed of copper having a pore diameter of $1.5 \times 10^{-2}$ centimeters and a pore path length twenty-six times the diameter of said pores,
(b) said coolant circulated through said cooling coils being liquid helium, and
(c) said coolant circulated through said cooling means being liquid nitrogen.

References Cited by the Examiner

UNITED STATES PATENTS

| 1,874,537 | 8/1932 | Jaycox | 230—101 |
| 2,289,845 | 7/1942 | Litton | 230—101 |
| 2,703,673 | 3/1955 | Winkler | 230—101 |
| 3,122,896 | 3/1964 | Hickey | 230—101 X |
| 3,221,197 | 11/1965 | Coppola | 230—69 X |
| 3,251,538 | 5/1966 | Barnitz | 230—101 |

FOREIGN PATENTS

| 1,058,690 | 6/1959 | Germany. |
| 815,067 | 6/1959 | Great Britain. |

ROBERT A. O'LEARY, *Primary Examiner.*

A. W. DAVIS, *Assistant Examiner.*